(12) United States Patent
Yoshida

(10) Patent No.: US 7,398,849 B2
(45) Date of Patent: Jul. 15, 2008

(54) MOUNTING STRUCTURE OF ELECTRONIC APPARATUS IN VEHICLE

(75) Inventor: Kei Yoshida, Kawasaki (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 267 days.

(21) Appl. No.: 11/259,370

(22) Filed: Oct. 27, 2005

(65) Prior Publication Data

US 2006/0096794 A1    May 11, 2006

(30) Foreign Application Priority Data

Oct. 27, 2004    (JP)    ............................... 2004-313160

(51) Int. Cl.
*B60R 16/04*    (2006.01)
(52) U.S. Cl. .................................... 180/68.5
(58) Field of Classification Search ................ 180/65.1, 180/68.5, 291; 248/503
See application file for complete search history.

(56) References Cited

U.S. PATENT DOCUMENTS

| 1,138,122 | A | * | 5/1915 | Lambert et al. ............ 180/68.5 |
| 2,181,406 | A | * | 11/1939 | Madden ........................ 104/91 |
| 4,013,300 | A | * | 3/1977 | Berger ......................... 280/834 |
| 4,317,497 | A | * | 3/1982 | Alt et al. ..................... 180/68.5 |
| 5,585,205 | A | | 12/1996 | Kohchi |
| 5,593,167 | A | * | 1/1997 | Barnhardt et al. ......... 280/164.1 |
| 6,176,338 | B1 | * | 1/2001 | Nakagawa et al. .......... 180/219 |
| 6,402,229 | B1 | * | 6/2002 | Suganuma ............. 296/203.02 |
| 7,025,160 | B2 | * | 4/2006 | Awakawa ................... 180/68.5 |

FOREIGN PATENT DOCUMENTS

JP    7 017 265    1/1995

* cited by examiner

*Primary Examiner*—Frank B Vanaman
(74) *Attorney, Agent, or Firm*—Jacobson Holman PLLC

(57) ABSTRACT

A structure for mounting electronic apparatuses in an electric motor-driven vehicle has a pair of first brackets each having a base part that is fixed to the side face of a chassis frame extending in the longitudinal direction of the vehicle and an arm part extending in the lateral direction of the vehicle. A pair of second brackets is fixed to the upper surfaces of the arm parts such that they extend in the longitudinal direction of the vehicle with a space between them. A battery unit is placed on the upper surfaces of the second brackets, and an electronic apparatus unit is placed under the battery unit between the second brackets. The structure enables electronic apparatuses to be mounted compactly, improves the efficiency of the electric motor by reducing the length of high voltage electric cables, and increases the available space for mounting the refrigerating system.

4 Claims, 8 Drawing Sheets

MOUNTING STRUCTURE OF ELECTRONIC APPARATUS IN VEHICLE

CROSS-REFERENCE TO RELATED APPLICATION

This application claims the benefit of priority to JP 2004-313160 filed Oct. 27, 2004.

FIELD OF THE INVENTION

The present invention relates to a mounting structure of electronic apparatuses in a motor-driven vehicle which has electronic apparatuses for controlling said motor and a battery unit which constitute an electric power source for said apparatuses.

DESCRIPTION OF THE RELATED ART

FIG. 9 is a plan view of a hybrid powered refrigeration car mounted with a diesel engine/electric motor combination.

In the drawing, reference numeral 51 is a cabin, 54 is a chassis frame, 53 are rear wheels, 55 is a mounting space for a refrigeration system.

Reference numeral 2 is a motor control unit to control a motor for driving the car, 1 is a high voltage battery unit constituting the electric source for said motor and motor control unit. Said high voltage battery unit 1 is attached to a side part of the chassis frame 54 between front wheels not shown in the drawing and the rear wheels 53. The motor control unit 2 is located under the mounting space 55.

According to the mounting structure of the electronic apparatuses of this hybrid powered refrigeration car, the high voltage battery unit 1 which claims large mounting space and the motor control unit 2 are not located in the same location, the battery unit 1 is located at a side part of the chassis frame 54 between the front and rear wheels, the motor control unit 2 is located in the lower part of the mounting space 55, and they are connected with electric cables.

In JP7-17265A is disclosed an art for mounting a battery storage box between front and rear wheels in a passenger car as shown in FIG.4 and FIG.6.

In the mounting structure of electronic apparatuses in a conventional vehicle shown in FIG. 9, the batteries 1 is mounted to a side part of the chassis frame 54 between front and rear wheels, and the motor control unit 2 is mounted in a lower part of the mounting space 55 apart from the battery unit 1, and they are connected with electric cables as mentioned above.

In the prior art, there are problems that,
(1) As the battery unit 1 and motor control unit 2 are located apart from each other and they are connected with electric cables, motor drive efficiency decreases by increased electric resistance of the electric cables increased in length, and malfunction is apt to occur in electronic apparatuses due to influence of electromagnetic waves generated by high voltage carrying cables.
(2) As the motor control unit 2 is located in the lower part of the mounting space 55, the space for mounting refrigerating means, etc. is reduced and ease of mounting them is deteriorated.

The art recited in JP7-17265A is no more than that a battery storage box accommodating batteries is mounted under the chassis frame between front and rear wheels or between right and left rear wheels, so clearance between the battery storage box and road surface is reduced, that is, road clearance is reduced, which affects road ability of the vehicle.

SUMMARY OF THE INVENTION

The present invention was made to solve the problems of prior art mentioned above and its object is to provide a structure for mounting electronic apparatuses to a vehicle in an electric motor-driven vehicle, in which the electronic apparatuses such as a high voltage battery unit and motor control unit can be mounted compactly in the same section with a minimum mounting space, as a result it becomes possible to mount them even in a vehicle of rather short wheelbase, driving efficiency of the electric motor can be improved by reducing the length of cables for transferring high voltage electric power, and by increasing a mounting space for accessories other than those relating to driving power of the vehicle.

To attain the object, the present invention proposes a structure for mounting electronic apparatuses to a vehicle in an electric motor-driven vehicle (50) having an electronic apparatus unit (2) for controlling an electric motor (61) to drive wheels (53) and a battery unit to constitute electric source for them, comprising:

a pair of first brackets each having a base part to be fixed to the side face of a chassis frame extending in the longitudinal direction of the vehicle and an arm part extending in the lateral direction of the vehicle outward, a pair of second brackets fixed to the upper surfaces of said arm parts such that the second brackets extend in the longitudinal direction of the vehicle with a certain space between them in the width direction of the vehicle, said battery unit placed on the upper surfaces of said second brackets, and said electronic apparatus unit located under said battery unit between said second brackets.

It is preferable in the invention that the height H of each of said second brackets is higher than the height H1 of said electronic apparatus unit.

Further, it is preferable in the invention that a bracket means comprised of said first brackets and second brackets is attached to the chassis frame of the vehicle between front and rear wheels.

According to the invention, there are provided a pair of first brackets fixed to the side face of the chassis frame, each of the first brackets having an arm part extending outward in the lateral direction of the vehicle, and a pair of second brackets which are fixed to the upper surfaces of the arm parts of the first brackets such that the second brackets extend in the lateral direction of the vehicle, the electronic apparatus unit is placed within the height of the second brackets, and the battery unit is placed on the upper surfaces of the second brackets, so the electronic apparatus unit is accommodated in the lower space of a bracket means comprised of the first and second brackets, the high voltage battery unit can be placed on the second brackets such that the battery unit laps over the electronic apparatus unit, and they can be fixed firmly to the chassis frame.

The electronic apparatus unit is contained within the height of the second brackets, and the electronic apparatus unit is protected against flying stones, etc. when the vehicle is running.

By composing the mounting structure like this, the electronic apparatus unit and high voltage battery unit are attached to the chassis frame in a state of overlapping each other, so the length in the longitudinal direction permissible for mounting them corresponds to maximum permissible length of the motor control unit or of the high voltage battery unit. Accordingly, it becomes possible to mount the motor control unit and high voltage battery unit to the side face of the chassis frame between front and rear wheels of a vehicle of rather small wheelbase while securing enough minimum ground clearance, or road clearance.

The electronic apparatus unit needs not be located apart from the high voltage battery unit as is the case with prior art in which the electronic apparatus unit is mounted in the lower part of the mounting space of the refrigerating system resulting in increased space for mounting the refrigerating system, and the mounting operation is eased.

Further, as the distance between the bottom face of the bracket means and the surface of road, that is minimum ground clearance, or road clearance can be secured enough, road ability, or ability to run on punishing road can be secured.

Therefore, according to the invention, the electronic apparatus unit and high voltage battery unit can be mounted in the same location in a minimum space by mounting the electronic apparatus unit and battery unit in the bracket means to overlap each other and fixing the bracket means to the side of the chassis frame.

In this way, the electronic apparatus unit and high voltage battery unit can be easily mounted to the side of the chassis frame between front and rear wheels regardless of the length of wheelbase.

Further, as cables connecting between the electronic apparatus unit and high voltage unit can be reduced in length as much as possible, electric resistance of the cables is reduced and occurrence of malfunction due to the effect of electromagnetic waves generated by the high voltage transfer line can be prevented or reduced, thus reduction in driving efficiency of the electric motor is prevented and undesirable influence to other electronic devices is prevented.

In the invention, it is preferable that an accessory (or accessories) is attached to said chassis frame between a front wheel of the vehicle and a bracket means comprised of said first brackets and second brackets.

In this way, as an electronic apparatus package consisting of the electronic apparatus and the high voltage battery unit laid overlapping each other in the bracket means fixed to the side of the chassis frame is located apart from a front wheel with said accessory being mounted between the front wheel and the electronic apparatus package, the electronic apparatus package can be protected against flying stones, etc. scattered by the front wheel.

In the invention, it is preferable that each of said second brackets has a vertical wall part, a lower flange extending from the lower end of said vertical wall part to be attached to the upper surfaces of the arm parts of said first brackets, and an upper flange extending from the upper end of said vertical wall part on which said battery unit is placed, and wherein said electronic apparatus unit is fixed to the walls of said second brackets.

With the construction like this, the motor control unit and high voltage battery unit are fixed to the second brackets, so it is not necessary to provide a mounting bracket for each of the motor control unit and high voltage battery unit, and the number of parts can be reduced.

Further, as the battery unit is fixed to the upper flange of the second brackets and the electronic apparatus unit is fixed to the vertical walls of the second brackets, the electronic apparatus unit can be easily removed by removing the bolts fixing the same to the second brackets and sliding the electronic apparatus unit in the longitudinal direction of the vehicle when replacing the electronic apparatus unit with a new one upon occurrence of any fault in the same. Thus, replacing of the electronic apparatus unit can be performed easily without removing the battery unit from the second brackets. A mounting process of the unit can be done in reverse order.

When replacing the battery unit, the high voltage battery unit can be removed easily without removing the motor control unit from the second brackets, for the battery unit is fixed to the upper flanges of the second brackets without interfering with the motor control unit.

According to the invention, the mounting structure is composed such that the battery unit is placed on the upper surfaces of the second brackets, the electronic apparatus unit is accommodated under the battery unit between the second brackets, and the first brackets are fixed to the side of the chassis frame, so that the space for mounting the electronic apparatus unit and high voltage battery unit can be reduced to a minimum in length in the longitudinal direction of the vehicle and the minimum ground clearance can be secured with the compact mounting structure. Therefore, the electronic apparatus unit and high voltage battery unit can be mounted in the same location in a minimum space, and they can be easily mounted to the side of the chassis frame between front and rear wheels regardless of the length of wheelbase.

Further, it is not necessary to locate the motor control unit in the lower part of the mounting space apart from the high voltage battery unit 1 as is the case with the prior art, so the space for mounting the refrigerating system is increased and mounting operation of the system can be eased.

Further, as the cables for connecting between the motor control unit and the high voltage battery unit can be reduced in length as much as possible, reduction in motor drive efficiency caused by electric resistance of the cables can be prevented.

Further, as electromagnetic waves generated by high voltage carrying cables can be reduced, undesirable influence to electronic apparatuses which may be caused by the electromagnetic waves can be prevented.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only, not as limitative of the scope of the present invention.

Figure 7:
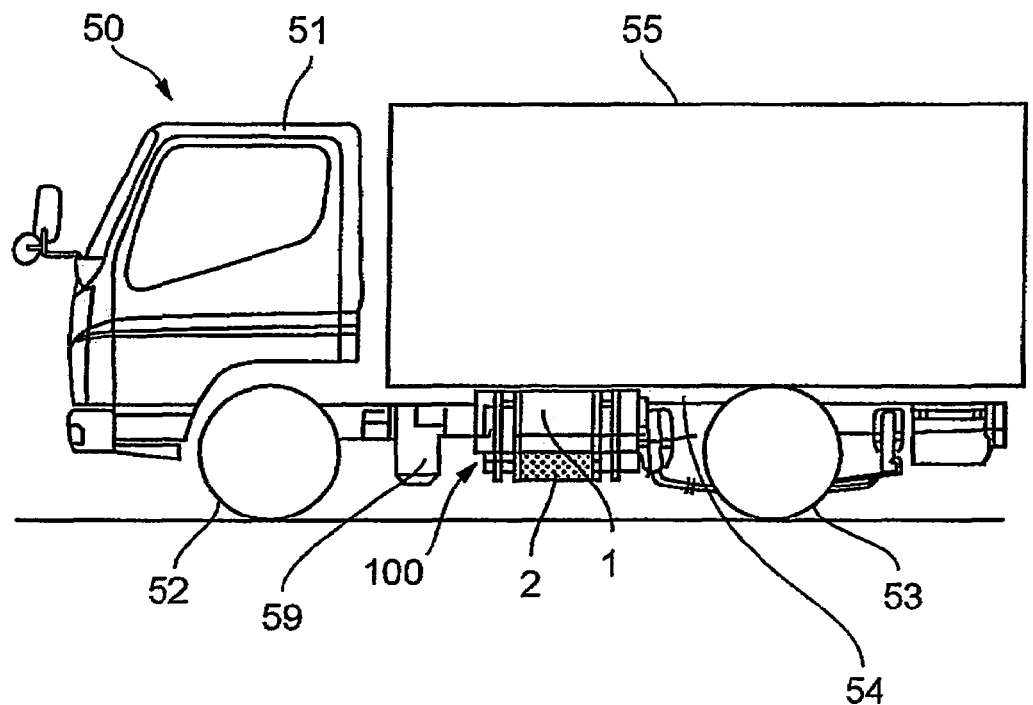
FIG. 7 is a side elevation of the embodiment of a hybrid powered refrigeration car mounted with a diesel engine/electric motor combination according to the present invention.
Figure 8:
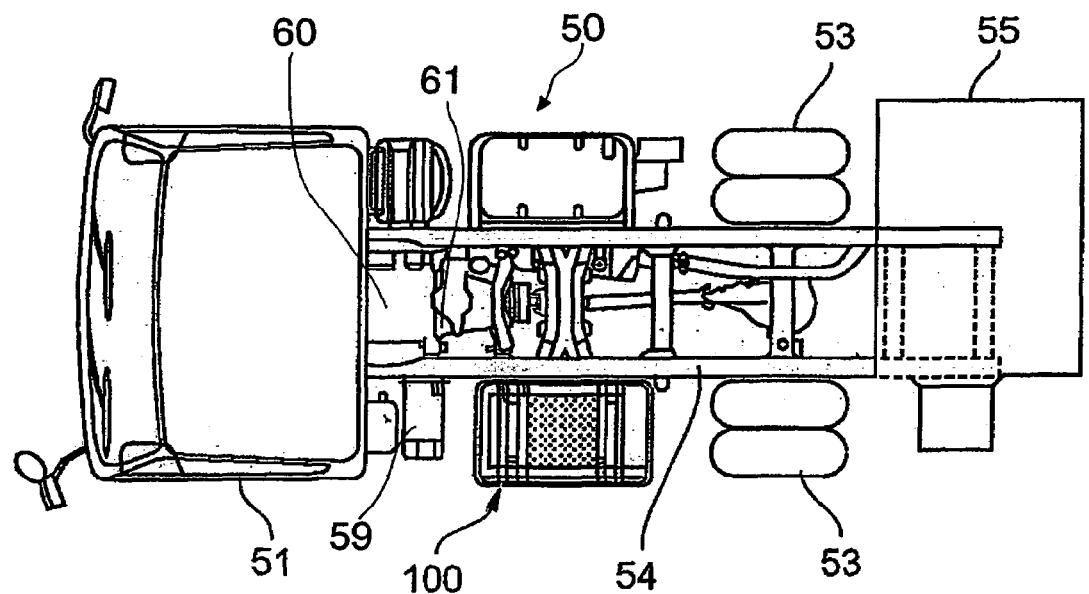
FIG. 8 is a plan view of the hybrid powered refrigeration car of said embodiment.

FIG. 7 is a side elevation of the embodiment of a hybrid powered refrigeration car mounted with a combination of a diesel engine 60 and an electric motor 61 according to the present invention, and FIG. 8 is a plan view of the embodiment. In FIGS. 7 and 8, reference numeral 50 is a vehicle, 51 is a cabin of the vehicle 50, 54 is a pair of right and left chassis frames, 52 are front wheels, 53 are rear wheels, and 55 is a mounting space for mounting a refrigeration system.

Reference numeral 2 is a motor control unit (electronic apparatus unit of the vehicle) for controlling said motor 61 for driving wheels, 1 is a high voltage battery unit constituting electric source for the motor 61 and motor control unit 2. The motor and motor control unit constitute an electronic apparatus package 100.

The motor 61 used in the embodiment is a motor-generator having both a function of driving the vehicle when running and a function of generating electricity when decelerating the vehicle.

The electronic apparatus package 100 comprising the high voltage battery unit 1 and motor control unit 2 is mounted to a bracket means 30 (see FIG.1) laying one over the other, and the bracket means 30 is fixed between the front and rear wheels to the left chassis frame 54 of the vehicle 50.

Other accessory (or accessories) 59 is mounted between the bracket means 30 attached with the battery unit 1 and motor control unit 2 and the left front wheel 52 of the vehicle 50.

With the construction like this, as the electronic apparatus package 100 mounted to the bracket means 30, which is fixed to the side of the chassis frame 54 between the front and rear wheels, is positioned apart from the front wheel across the accessory 59, the electronic apparatus package 100 can be protected against flying stones, etc. scattered by the front wheel.

Figure 1:
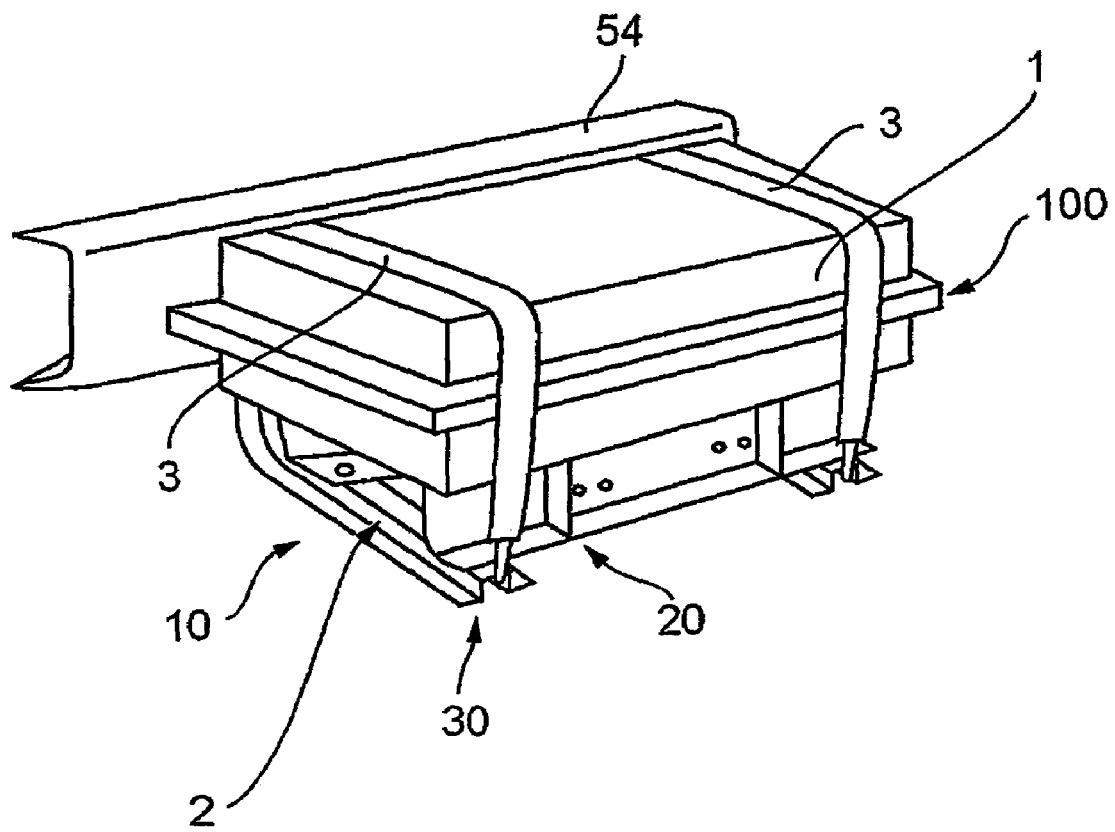
FIG. 1 is a perspective view of the embodiment of the mounting structure of a battery unit and a motor control unit to the chassis frame of a hybrid powered refrigeration car mounted with a diesel engine/electric motor combination by use of a bracket means according to the present invention.

Next, FIG. 1 is a perspective view of the embodiment of mounting structure of battery unit and a motor control unit to the chassis frame of a hybrid powered refrigeration car mounted with a diesel engine/electric motor combination by use of a bracket means according to the present invention.

In FIG. 1, reference numeral 30 is a bracket means. The bracket means 30 consists of a pair of the first brackets 10 each of which has a base part 12z (see FIG. 3) fixed to the side face of the chassis frame extending in the longitudinal direction of the vehicle and an arm part 12y (see FIG. 3) extending laterally outwardly to form the general shape of a letter 'L', each of the first brackets being disposed apart from each other, and a plurality (two in the embodiment as mentioned later) of the second brackets 20 fixed to the upper surface of the arm part of each of the first brackets 10 such that they extend in the longitudinal direction of the vehicle with a certain distance to each other in the lateral direction of the vehicle.

The motor control unit 2 is fixed to the second bracket 20, and the high voltage battery unit 1 is laid over the motor control unit 2 and fixed to the second brackets 20.

Reference numeral 3 designates strip-shaped fixing members extending from the upper part of the first bracket 10 respectively and surrounding the high voltage battery unit 1 to be fixed to the brackets 10 at the lower ends thereof. The high voltage battery unit 1 and motor control unit 2 are fixed firmly to the bracket means 30 with a pair of said fixing members 3.

Next, steps of procedure of mounting the battery unit and motor control unit to the chassis frame by use of the bracket means will be explained with reference to FIG. 2 to FIG. 6.

Figure 2:
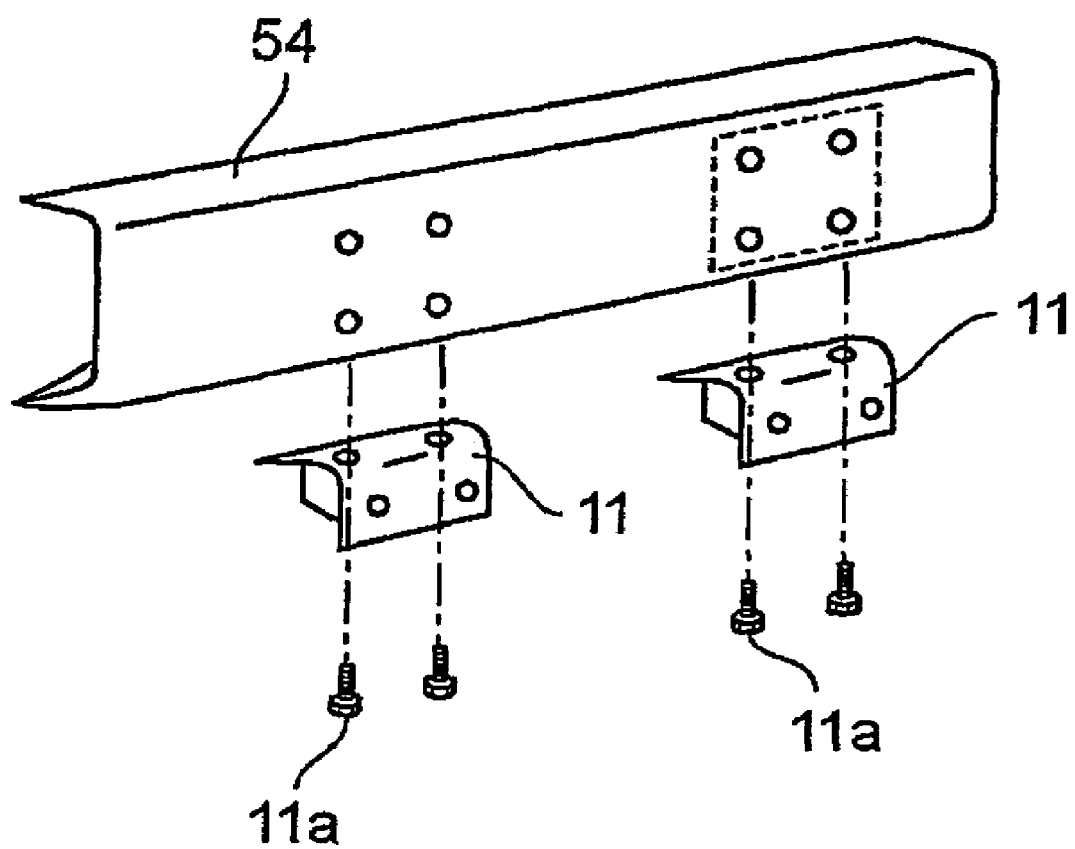
FIG. 2 is a perspective view showing the first step of assembling said bracket means.

First, referring to FIG. 2, two connecting members 11 each of which constitutes a part of each of the first brackets 10 are fixed to the undersurface of the chassis frame 54 with bolts 11a.

Figure 3:
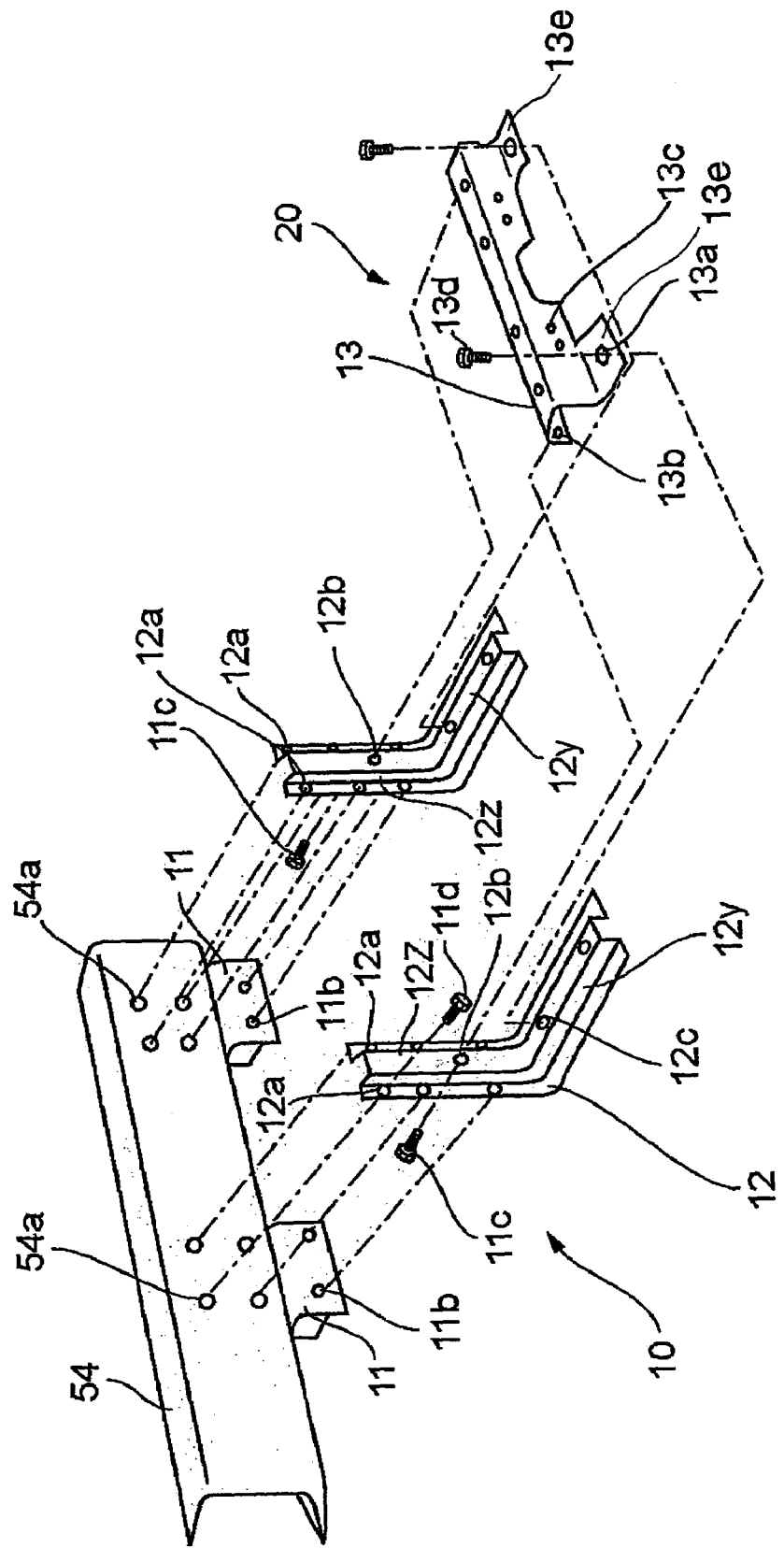
FIG. 3 is a perspective view showing the second step of assembling said bracket means.

Next, referring to FIG.3, two L-shaped members 12 each having a base part 12z and an arm part 12y perpendicular to the former to form the general shape of a letter 'L' and constituting a part of the first 10 are provided, the base part 12z of each of the L-shaped members 12 is fixed to the side face of the chassis frame 54 and each of the connecting members 11 by screwing six bolts 11d into screw holes 54a of the chassis frame 54 and a screw holes 11b of the connecting member 11 through holes 12a of the L-shaped members 12.

A battery support member 13 of substantially U-shape, which is manufactured separately, constituting one of the second brackets 20 is provided, and the battery support member 13 is fixed to each of the L-shaped members 12 with its side face brought into contact with the surface of the center plate part of the base part 12z which constitutes a vertical wall of each of the L-shaped member 12 by screwing bolts 11c into screw holes 13b of the battery support member 13 through each of holes 12b of the L-shaped members 12. Further bolts 13d are screwed into screw holes 12c through holes 13a of foot plate parts 13e of the battery support member 13.

Figure 4:
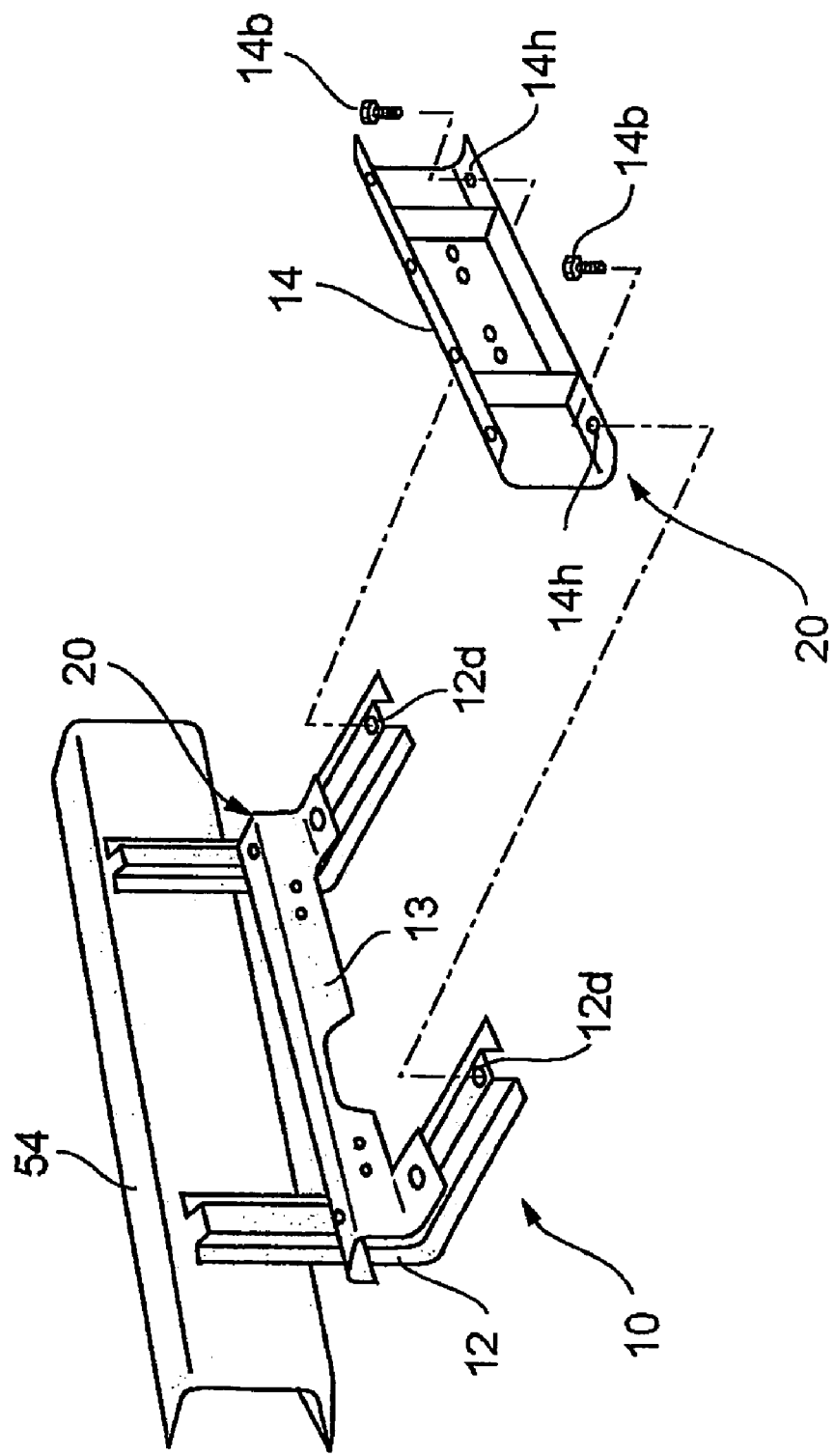
FIG. 4 is a perspective view showing the third step of assembling said bracket means.

Next, referring to FIG.4, another battery support member 14 of substantially U-shape, which is manufactured separately, constituting another one of the second brackets 20 is provided, and the battery support member 14 is laid by its flange part on the surface of the arm part 12y of each of the L-shaped members 12 at the end part of the arm part 12y and fixed thereto by screwing into screw holes 12d of the L-shaped members 12 through holes 14h of the battery support member 14.

Figure 5:
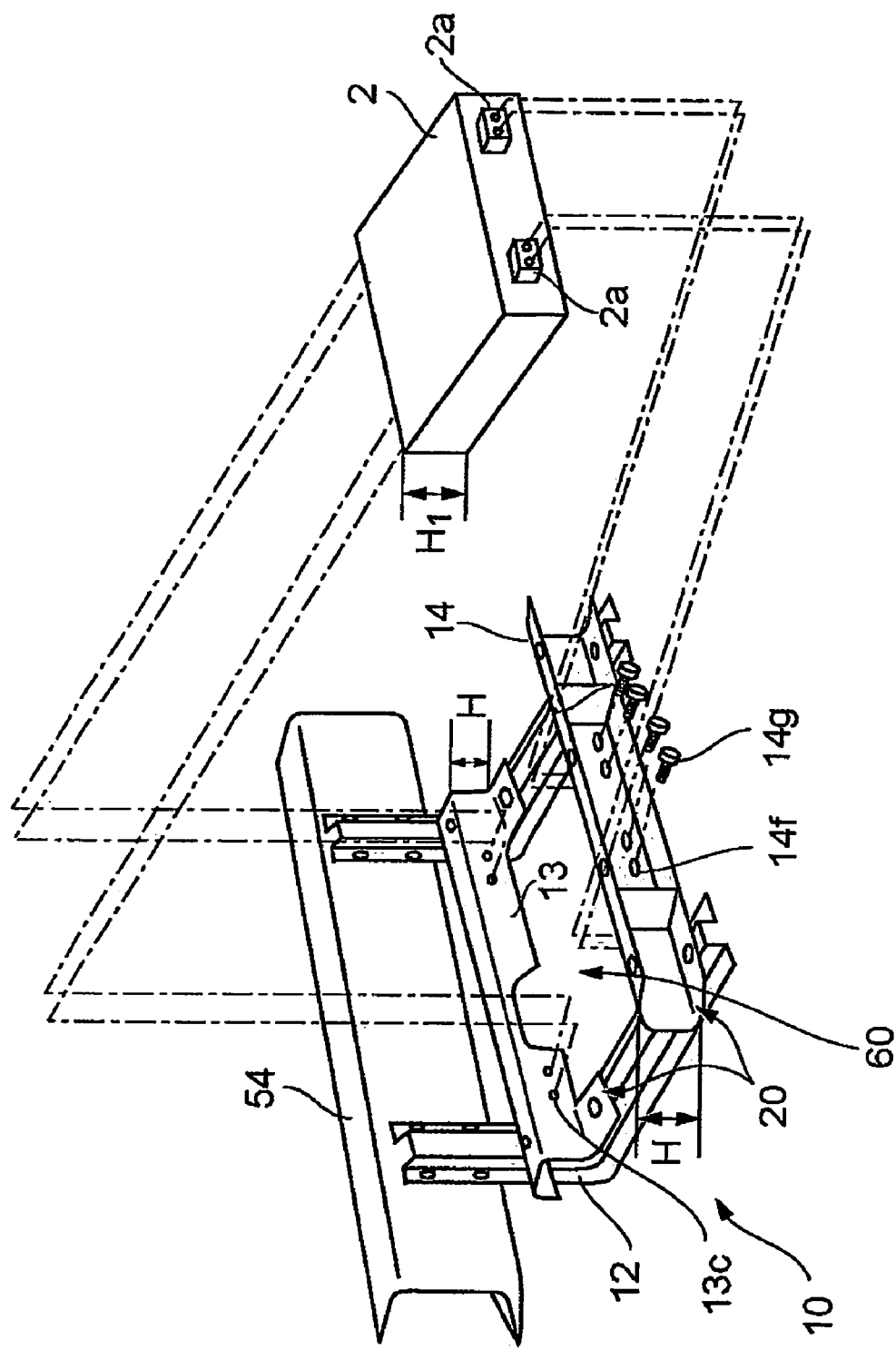
FIG. 5 is a perspective view showing the fourth step of assembling said bracket means.

Next, referring to FIG. 5, the motor control unit 2 is placed in the space between the two battery support members 13 and 14, whereby each of the battery support members is formed to have height H slightly higher than height H1 of the motor control unit 2.

Then, the side of the motor control unit 2 is fixed to the vertical wall of each of the battery support members 13 and 14 by screwing bolts 14g into screw holes 2a provided on both sides of the motor control unit 2 through holes 13c of the battery support member 13 and holes 14f of the battery support member 14.

As the height H of the battery support members 13 and 14 is slightly higher than the height H1 of the motor control unit 2, upper surface of the motor control unit 2 does not protrude from the upper surfaces of the battery support members 13 and 14, the battery unit placed afterward on the upper surfaces of the battery support members does not interfere with the motor control unit.

Further, the motor control unit 2 is surrounded by the L-shaped members 12 of the first brackets 10, two battery support members constituting the second brackets 20 and the battery unit 1, and side faces thereof can be protected against flying stones, etc. when the vehicle is running.

Figure 6:
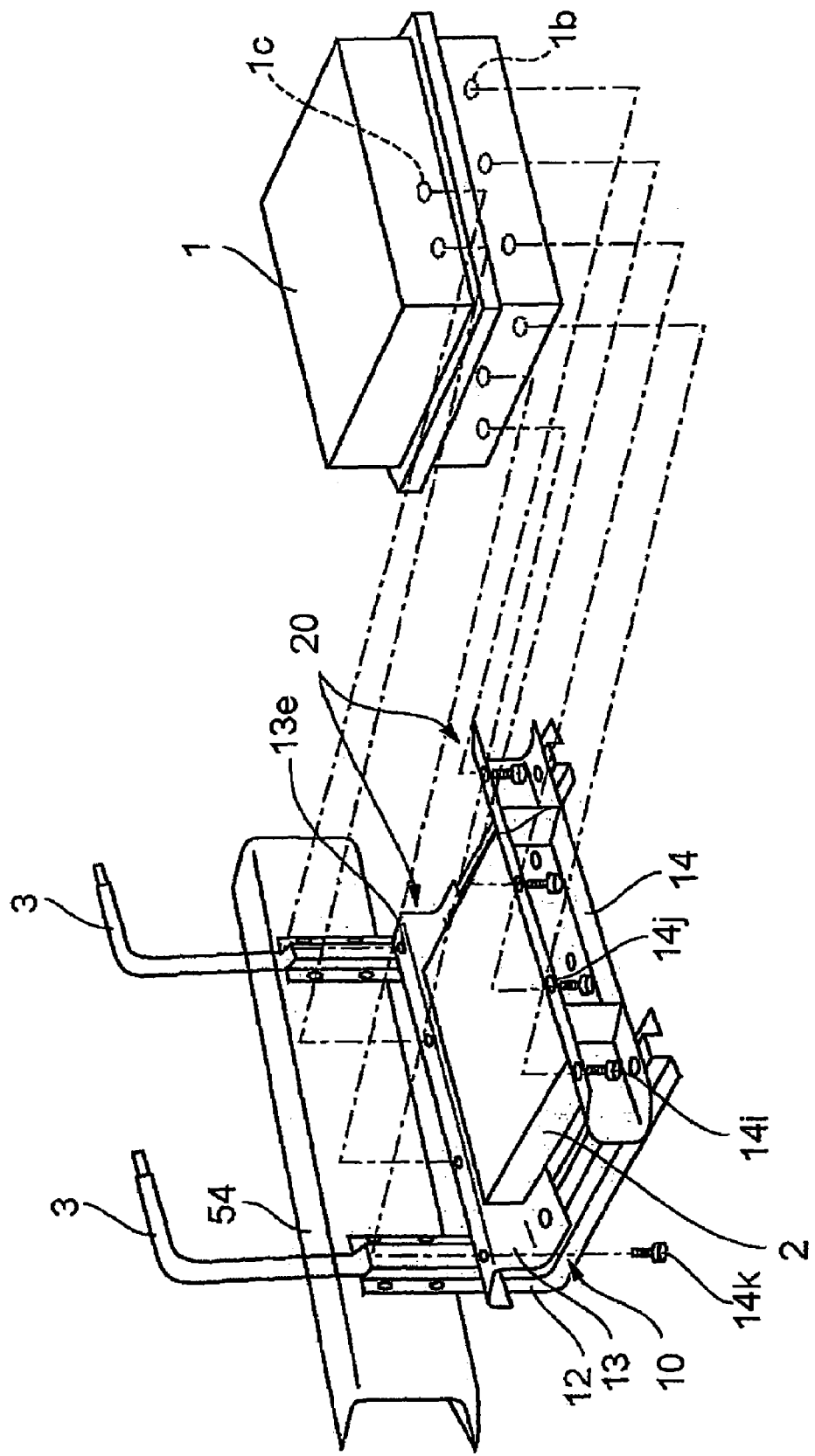
FIG. 6 is a perspective view showing the fifth step of assembling said bracket means.

Next, in FIG.6, the high voltage battery unit 1 is placed on the upper surfaces of two battery support members 13 and 14, and bolts 14k are threaded into screw holes 1c of the high voltage battery unit 1 through holes 13e of the battery support members 13, and bolts 14i are threaded into screw holes 1b of the high voltage battery unit 1 through holes 14j of the battery support members 13. In this way, the high voltage battery unit 1 is fixed to the battery support members 13 and 14 firmly in a state the high voltage battery unit 1 laps over the motor control unit 2.

Then, two fixing members 3 of the shape of a strip are allowed to wind the high voltage battery unit 1 from the upper part of each of the L-shaped members 12 to be fixed at the lower part of each of the L-shaped members 12. By this, the high voltage battery unit 1 and motor control unit 2 can be fixed firmly to the bracket means 30 with oscillation in the upper part of the bracket means 30 being prevented.

According to the embodiment, the first brackets 10 comprising two L-shaped members 12 each having a base part 12z and an arm part 12y extending perpendicular to the base part 12z to be formed into the general shape of a letter 'L', are fixed to the side face of the chassis frame 54 by the base parts 12z thereof, the second brackets 20 comprised of two battery support members 13 and 14 are fixed to the first brackets 10 on the upper surface of each of the arm parts thereof to extend in the longitudinal direction of the vehicle, each of the battery support members 13 and 14 being higher in its height than that of the high voltage battery unit 1, the motor control unit 1 is placed between the battery support members 13 and 14, and the high voltage battery unit is placed on the upper surfaces of the battery support members 13 and 14, so that the high voltage unit can be located to lap over the motor control unit within the height of the bracket means 30 and fixed firmly to the chassis frame 54.

Therefore, by allowing the high voltage battery unit 1 to lap over the motor control unit 2, the length in the longitudinal direction of the chassis frame between front and rear wheels permissible for mounting them corresponds to maximum permissible length of the motor control unit or of the high voltage battery unit. Accordingly, it becomes possible to mount the motor control unit 2 and high voltage battery unit 1 to the side face of the chassis frame 54 between front and rear wheels of a vehicle of rather small wheelbase.

Further, the second brackets 20 are fixed on the upper surfaces of the arm parts 12y of the first brackets 10 and the motor control unit 2 is mounted within the height of the second brackets 20, so enough road clearance can be secured and road ability of the vehicle is assured.

Further, as the motor control unit 2 is fixed to the vertical walls of the second bracket 20 with bolts 14g, the motor control unit 2 can be easily removed from the second brackets 20 by loosening the bolts 14g and sliding the motor control unit 2 in the longitudinal direction of the vehicle when any fault in the motor control unit occurs and replacement thereof is needed, and when mounting and fixing a new motor control unit, it can be slid into the bracket means 30 and fixed to the second brackets without removing the high voltage battery unit 1, thus replacement of the motor control unit 2 can be easily performed.

Also the high voltage battery unit 1 can be replaced without removing the motor control unit 2 from the second bracket 20, for the battery unit 1 is fixed to the upper flanges of the second brackets 20 without interfering with the motor control unit.

As the motor control unit 2 and high voltage battery unit 1 are fixed to the second bracket 20, it is not necessary to provide an attaching bracket for each of the motor control unit 2 and high voltage battery unit 1, and the number of parts can be reduced.

Figure 9:
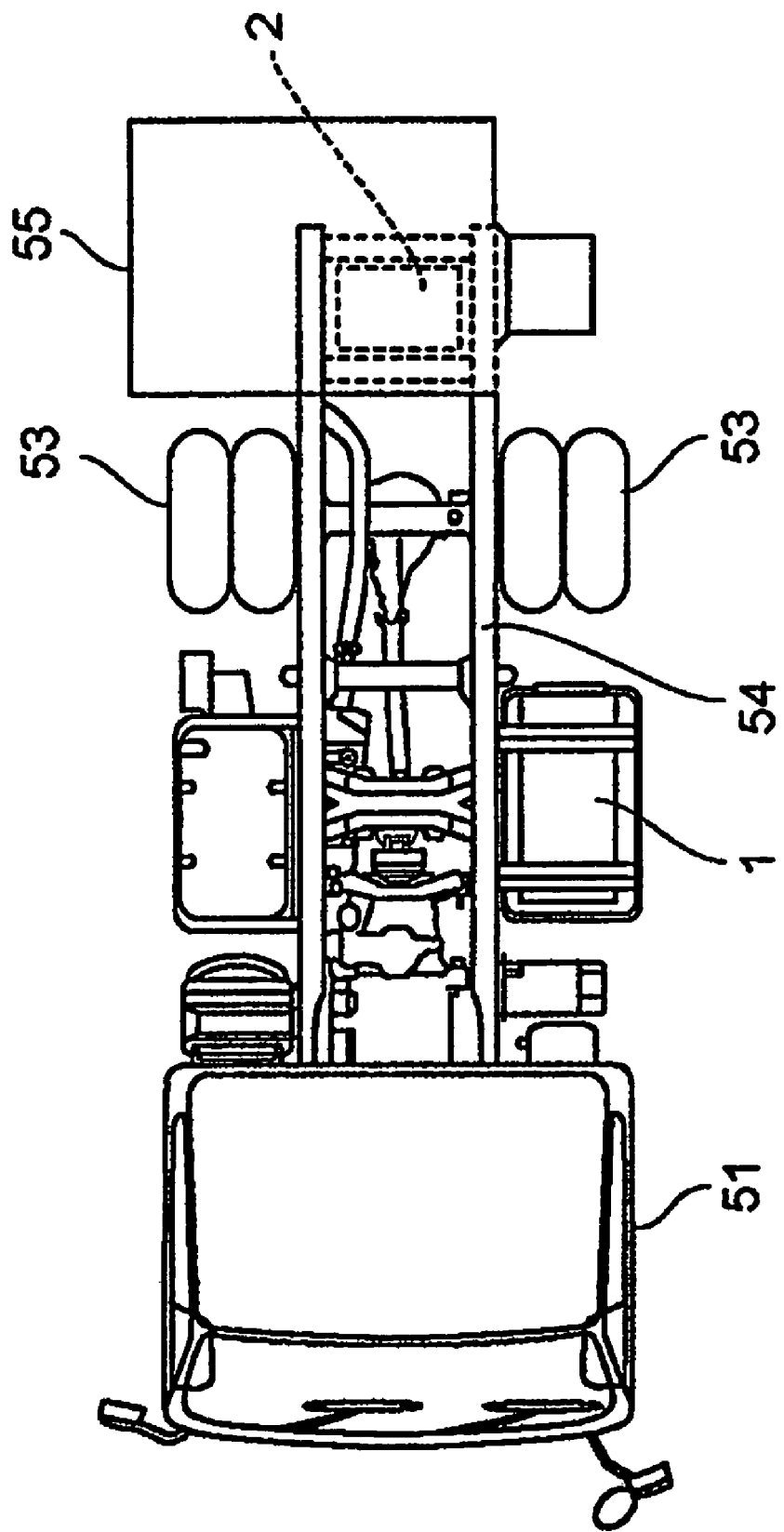
FIG. 9 is a plan view showing prior art corresponding to FIG. 8.

It is not necessary to locate the motor control unit 2 in the lower part of the mounting space 55 apart from the high voltage battery unit 1 as is the case with the prior art of FIG. 9, so the space for mounting the refrigerating system is increased and mounting operation of the system can be eased.

Further, as the cables for connecting between the motor control unit 2 and the high voltage battery unit 1 can be reduced in length to the minimum, reduction in motor drive efficiency caused by electric resistance of the cables can be prevented and also undesirable influence to electronic apparatuses caused by electromagnetic waves generated by high voltage carrying cables can be prevented, for the electromagnetic waves can be reduced.

As the motor control unit 2 is surrounded by the battery support members 13 and 14, by the bottom of the high voltage battery unit 1, and by the accessory 59 respectively in the lateral side, in the upper side, and in the front side thereof, it is protected from breakage by flying stones, etc. when the vehicle is running.

Although the case of a hybrid powered vehicle is explained in the example of embodiment of the invention, the invention can be applied to an electric vehicle with a battery unit charged by an outside electric source.

According to the invention, a structure for mounting electronic apparatuses to a vehicle in an electric motor-driven vehicle can be provided, in which the electronic apparatuses such as a high voltage battery unit and motor control unit can be mounted compactly in the same section occupying a minimum mounting space. As a result they can be mounted also in a vehicle of rather short wheelbase, driving efficiency of the electric motor can be improved by reducing the length of cables for transferring high voltage electric power, and space for mounting the refrigerating system can be increased which eases the mounting of the refrigerating system.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A structure for mounting electronic apparatuses to a vehicle in an electric motor-driven vehicle having an electric apparatus unit for controlling an electric motor to drive wheels and a battery unit constituting an electric source for said electric apparatus unit, comprising:

a pair of first brackets each having a base part fixed to a side face of a chassis frame extending in a longitudinal direction of the vehicle and an arm part extending in a lateral direction of the vehicle, and a pair of said first brackets being provided with a specified distance to each other in the longitudinal direction of the vehicle; and a pair of second brackets each fixed to an upper surface of said arm parts such that the second brackets extend in the longitudinal direction of the vehicle with a specified space between them, said battery unit being placed on the upper surfaces of said second brackets, said electronic apparatus unit being located under said battery unit between said second brackets, and each of said second brackets having a vertical wall part, a lower flange extending from a lower end of said vertical wall part that is attached to the upper surfaces of the arm parts of said first brackets, and an upper flange extending from an upper end of said vertical wall part on which said battery unit is placed, said electronic apparatus unit being fixed to the vertical wall parts of said second brackets.

2. The structure for mounting electronic apparatuses to a vehicle according to claim 1, wherein a height H of each of said second brackets is higher than a height H1 of said electronic apparatus unit.

3. The structure for mounting electronic apparatuses to a vehicle according to claim 1, wherein a bracket means that includes said first brackets and second brackets is attached to the chassis frame of the vehicle between front and rear wheels.

4. The structure for mounting electronic apparatuses to a vehicle according to claim 3, wherein said bracket means is attached to said chassis frame behind an accessory that is attached to the chassis frame between the front and rear wheels.

* * * * *